(12) United States Patent
Huelsman et al.

(10) Patent No.: US 7,423,840 B2
(45) Date of Patent: Sep. 9, 2008

(54) MAGNETIC TAPE RECORDING SYSTEM HAVING TAPE WITH DEFINED REMANENT MAGNETIZATION

(75) Inventors: Gary L. Huelsman, St. Paul, MN (US); Subodh K. Kulkarni, Woodbury, MN (US); W. Blake Kolb, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 386 days.

(21) Appl. No.: 11/233,576

(22) Filed: Sep. 22, 2005

(65) Prior Publication Data

US 2006/0019121 A1 Jan. 26, 2006

Related U.S. Application Data

(62) Division of application No. 10/238,161, filed on Sep. 10, 2002, now Pat. No. 6,960,385.

(51) Int. Cl.
G11B 5/66 (2006.01)

(52) U.S. Cl. .................... 360/134; 428/842

(58) Field of Classification Search ............. None
See application file for complete search history.

(56) References Cited

U.S. PATENT DOCUMENTS

| | | |
|---|---|---|
| 2,761,419 A | 9/1956 | Mercier et al. |
| 3,782,947 A | 1/1974 | Krall |
| 4,113,903 A | 9/1978 | Choinski |
| 4,203,769 A | 5/1980 | Guestaux |
| 4,731,292 A | 3/1988 | Sasaki et al. |
| 4,784,907 A | 11/1988 | Matsufuji et al. |
| 4,784,914 A | 11/1988 | Matsufuji et al. |
| 4,837,045 A | 6/1989 | Nakajima |
| 4,842,900 A | 6/1989 | Miyamoto |
| 4,854,262 A | 8/1989 | Chino et al. |
| 4,984,533 A | 1/1991 | Takahashi et al. |
| 5,030,484 A | 7/1991 | Chino et al. |
| 5,034,271 A | 7/1991 | Miyoshi et al. |
| 5,072,688 A | 12/1991 | Chino et al. |

(Continued)

FOREIGN PATENT DOCUMENTS

EP 0 313 043 4/1989

(Continued)

OTHER PUBLICATIONS

Streitwieser, Jr. et al., Introduction to Organic Chemistry, McMillan Publishing Co., Inc. (NY, NY 1976) pp. 947-949.

(Continued)

*Primary Examiner*—Holly Rickman
(74) *Attorney, Agent, or Firm*—Eric D. Levinson

(57) ABSTRACT

A magnetic recording tape exhibits reduced magnetic flux modulation and improved signal-to-noise ratio. Providing a magnetic recording layer with a more uniform thickness can improve the magnetic flux modulation characteristic. For example, the magnetic recording tape may have a coercivity of greater than or equal to 2000 Oe with a magnetic flux modulation characteristic having a one sigma standard deviation of less than 0.06. In some cases, the magnetic flux modulation characteristic may have a one sigma standard deviation of less than 0.05, or even 0.04. Reduced magnetic flux modulation can support increased storage densities.

17 Claims, 5 Drawing Sheets

U.S. PATENT DOCUMENTS

| | | |
|---|---|---|
| 5,083,524 A | 1/1992 | Hiraki et al. |
| 5,099,786 A | 3/1992 | Shibata et al. |
| 5,108,787 A | 4/1992 | Hiraki et al. |
| 5,119,757 A | 6/1992 | Chino et al. |
| 5,165,999 A | 11/1992 | Ushimaru et al. |
| 5,203,922 A | 4/1993 | Shibata et al. |
| 5,258,231 A | 11/1993 | Okita et al. |
| 5,294,525 A | 3/1994 | Yamauchi et al. |
| 5,395,743 A | 3/1995 | Brick et al. |
| 5,413,900 A | 5/1995 | Yokota |
| 5,496,607 A | 3/1996 | Inaba et al. |
| 5,501,903 A | 3/1996 | Erkkila et al. |
| 5,510,187 A | 4/1996 | Kumar et al. |
| 5,514,528 A | 5/1996 | Chen et al. |
| 5,593,734 A | 1/1997 | Yuan et al. |
| 5,597,680 A | 1/1997 | Wang et al. |
| 5,681,687 A | 10/1997 | Lelental et al. |
| 5,709,985 A | 1/1998 | Morrison et al. |
| 5,712,345 A | 1/1998 | Erkkila et al. |
| 5,725,665 A | 3/1998 | Yapel et al. |
| 5,735,969 A | 4/1998 | Lown et al. |
| 5,756,272 A | 5/1998 | Landry-Coltrain et al. |
| 5,759,666 A | 6/1998 | Carlson et al. |
| 5,763,046 A | 6/1998 | Ejiri et al. |
| 5,763,076 A | 6/1998 | Coons, III et al. |
| 5,772,857 A * | 6/1998 | Zhang ..................... 204/192.2 |
| 5,784,914 A | 7/1998 | Cianl |
| 5,798,136 A | 8/1998 | Landry-Coltrain et al. |
| 5,804,360 A | 9/1998 | Schell et al. |
| 5,821,027 A | 10/1998 | Landry-Coltrain et al. |
| 5,834,174 A | 11/1998 | Smith et al. |
| 5,837,324 A | 11/1998 | Yapel et al. |
| 5,843,530 A | 12/1998 | Jerry et al. |
| 5,846,699 A | 12/1998 | Wang et al. |
| 5,849,363 A | 12/1998 | Yapel et al. |
| 5,853,819 A | 12/1998 | Lelental et al. |
| 5,861,195 A | 1/1999 | Bhave et al. |
| 5,866,312 A | 2/1999 | Wang et al. |
| 5,932,330 A | 8/1999 | Ohkubo et al. |
| 5,998,549 A | 12/1999 | Milbourn et al. |
| 6,012,327 A | 1/2000 | Seth et al. |
| 6,120,853 A | 9/2000 | Naruse et al. |
| 6,136,428 A | 10/2000 | Thuong et al. |
| 6,139,982 A | 10/2000 | Bottomley et al. |
| 6,214,530 B1 | 4/2001 | Morrison et al. |
| 6,280,813 B1 | 8/2001 | Carey et al. |
| 6,541,132 B2 * | 4/2003 | Noguchi et al. .......... 428/842.8 |
| 6,610,426 B2 * | 8/2003 | Hashimoto et al. ....... 428/844.6 |
| 6,960,385 B2 * | 11/2005 | Huelsman et al. ........... 428/323 |
| 2002/0150792 A1 | 10/2002 | Kolb et al. |
| 2004/0072024 A1 * | 4/2004 | Mori et al. .............. 428/694 B |
| 2006/0019126 A1 * | 1/2006 | Huelsman et al. ........... 428/836 |

FOREIGN PATENT DOCUMENTS

| | | |
|---|---|---|
| EP | 0 538 724 | 4/1993 |
| EP | 0 603 582 | 2/1997 |
| WO | WO 96/08319 | 3/1996 |
| WO | WO 96/24088 | 8/1996 |
| WO | WO 98/43746 | 10/1998 |

OTHER PUBLICATIONS

Cohen et al., Modern Coating & Drying Technology, VCH Publishers, (1992), pp. 9, 119-120, 142-145, 156-159, and 162-163.

Miyamoto, "On the Difference of Three Die Coating Methods: History and Characteristics of Die Coating Methods," 10th International Coating Science and Technology Symposium, Technical Session 5: Coating Fundamentals, Sep. 26, 2000, Scottsdale, Arizona.

* cited by examiner

MAGNETIC TAPE RECORDING SYSTEM HAVING TAPE WITH DEFINED REMANENT MAGNETIZATION

This application is a divisional application of U.S. application Ser. No. 10/238,161 entitled "MAGNETIC RECORDING MEDIUM" filed Sep. 10, 2002 now U.S. Pat. No. 6,960,385, which is incorporated herein by reference in its entirety.

TECHNICAL FIELD

The invention relates to data storage media and, more particularly, to magnetic recording media and manufacture of magnetic recording media.

BACKGROUND

Magnetic recording media are widely used in a variety of data storage applications and may take the form of magnetic tape or magnetic disks. A magnetic recording medium generally includes a magnetic recording layer that is coated onto a non-magnetic substrate. One or more intermediate layers, such as a carrier or "sub" layer, may reside between the magnetic recording layer and the substrate.

Larger data storage demands and technological advancements have led to increased data storage densities. Data ordinarily is recorded along one of several tracks formed on the magnetic recording layer. To achieve increased data storage density, magnetic media are designed to accommodate a higher number of tracks and a higher number of magnetizations along the length of each track.

With increased data storage densities, maintenance of sufficient signal-to-noise ratios for effective readout of the more closely packed magnetizations has become a challenge. In particular, acceptable readout performance has required adherence to more aggressive drive and recording medium tolerances and improved process control.

SUMMARY

The invention is directed to a magnetic recording medium having reduced magnetic flux modulation and improved signal-to-noise ratio. The magnetic recording medium may take the form of a magnetic tape or a magnetic disk.

Magnetic flux is a function of the remanent magnetization ($M_r$) of a recording layer and the recording layer thickness. The remanent magnetization is the permanent magnetization that remains in a magnetic material forming a magnetic recording layer after an external magnetic field is removed. Hence, the remanent magnetization supports recording of data. Modulation of the recording layer thickness along the recording path can impact the signal-to-noise ratio of data recorded on and read from the magnetic recording medium by producing magnetic flux modulation.

Providing a magnetic recording layer with a more uniform thickness along the recording direction of the magnetic recording medium, in accordance with the invention, can improve the magnetic flux modulation characteristic. The recording direction may refer to the direction of tracks on a tape or disk. A wet-on-wet coating technique such as slide coating or slot coating may be especially useful in achieving desired uniformity of thickness in the magnetic recording layer. Slide coating, in particular, may offer enhanced motion quality and coating uniformity, as will be described.

For example, the invention may provide a magnetic recording medium having a coercivity of greater than or equal to 2000 Oe with a magnetic flux modulation characteristic having a one sigma standard deviation of less than 0.06. In some embodiments, the magnetic flux modulation characteristic may have a one sigma standard deviation of less than 0.05, or even 0.04. The reduced magnetic flux modulation can support increased storage densities and enhanced recording performance.

In one embodiment, the invention provides a magnetic recording medium comprising a substrate and a magnetic recording layer formed over the substrate. The magnetic recording layer has a magnetic flux modulation characteristic with a standard deviation of less than or equal to approximately 0.06.

In another embodiment, the invention provides a magnetic recording medium comprising a substrate, a carrier layer formed over the substrate, and a magnetic recording layer formed over the carrier layer. The magnetic recording layer has an average thickness of less than or equal to 0.15 microns, a coercivity of greater than 2000 Oe and a magnetic flux modulation characteristic with a standard deviation of less than or equal to approximately 0.06.

In an added embodiment, the invention provides a magnetic tape recording system.

The system comprises a magnetic recording tape with a magnetic recording layer having a magnetic flux modulation characteristic with a standard deviation of less than or equal to approximately 0.06, a magnetic recording head, and a controller that controls the magnetic recording to read data from and write data to the magnetic recording medium.

In a further embodiment, the invention provides a method comprising flowing a first fluid coating formulation over a first slide coating surface of a slide coater, flowing a second fluid coating formulation containing metal magnetic recording particles over a second slide coating surface of the slide coater and over the first coating formulation, the first and second coating formulations forming a multi-layer coating, and flowing the multi-layer coating onto a moving substrate to simultaneously apply the first and second coating formulations to the substrate. The method further comprises controlling the second fluid coating formulation to have, upon drying, a magnetic flux modulation characteristic with a standard deviation of less than or equal to approximately 0.06.

The invention may provide one or more advantages. For example, with a reduced magnetic flux modulation characteristic, data can be read from the magnetic recording medium with an improved signal-to-noise ratio. Reduced magnetic flux modulation can be achieved by carefully controlling the thickness uniformity of a magnetic recording layer in the magnetic recording medium along the direction of recording. In general, a magnetic recording layer with a more uniform thickness is capable of providing a magnetic flux modulation characteristic that exhibits less variation across the surface of a magnetic recording medium. Hence, in accordance with the invention, a more uniform recording layer thickness can be exploited to achieve improved signal-to-noise ratio and increased read/write performance. An improved signal-to-noise ratio is particularly advantageous for higher density magnetic recording.

The details of one or more embodiments of the invention are set forth in the description below. Other features, objects, and advantages of the invention will be apparent from the description and from the claims.

DETAILED DESCRIPTION

Figure 1:
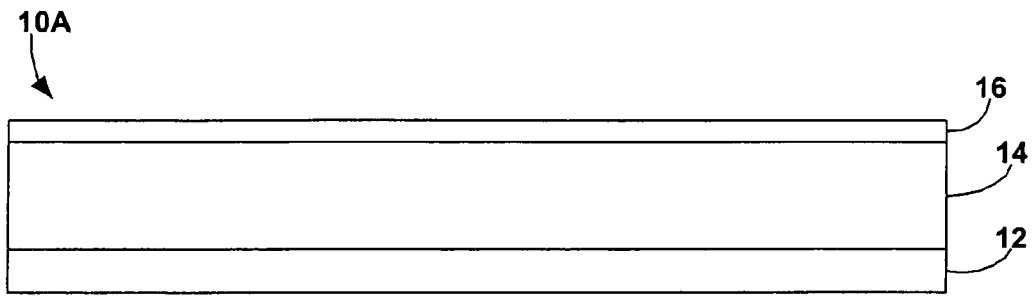
FIG. 1 is a cross-sectional side view of a magnetic recording medium.

FIG. 1 is a cross-sectional side view of a magnetic recording medium 10A. As shown in FIG. 1, magnetic recording medium 10A may include a substrate 12, a carrier layer 14 formed over the substrate, and a magnetic recording layer 16 formed over the carrier layer. In some embodiments, one or more additional layers may be formed over magnetic recording layer 16. Magnetic recording medium 10A may take the form of a magnetic tape or a magnetic disk. As will be described, magnetic recording medium 10A may be formed by a multi-layer, wet-on-wet coating process, such as slide coating or dual slot coating, to produce enhanced uniformity of thickness within magnetic recording layer 16.

Enhanced uniformity can be effective in reducing magnetic flux modulation in magnetic recording layer 16, i.e., increasing magnetic flux uniformity, and thereby improving signal-to-noise ratio of data recorded in the magnetic recording layer. In turn, increased signal-to-noise ratio may permit increased data storage densities. For example, magnetic recording layer 16 may have a magnetic flux modulation characteristic with a one sigma standard deviation of less than 0.06 along the recording direction of magnetic recording medium 10, as well as a coercivity of greater than or equal to approximately 2000 Oe and, more preferably, greater than or equal to approximately 2400 Oe. In some embodiments, the magnetic flux modulation characteristic may have a one sigma standard deviation of less than 0.05, or even 0.04.

Figure 2:
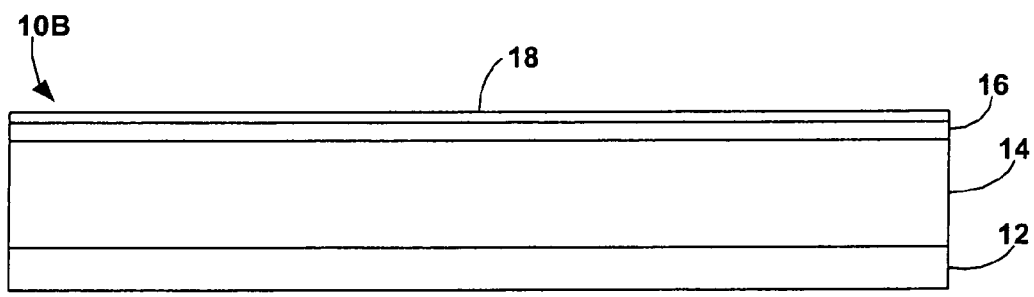
FIG. 2 is a cross-sectional side view of an alternative magnetic recording medium.

FIG. 2 is a cross-sectional side view of an alternative magnetic recording medium 10B. A magnetic recording medium 10B in accordance with the invention may include one or more additional layers, such as a layer 18 formed over magnetic recording layer 16 in magnetic recording medium 10B of FIG. 2. Magnetic recording media 10A, 10B may be referred to generally herein as magnetic recording media 10. The additional layers within magnetic recording medium 10B shown in FIG. 2 may include, for example, antistatic material, abrasive material that aids the cleaning of recording heads during use, lubricating materials that reduce friction between the magnetic recording head and the surface of the magnetic recording medium, or a combination thereof. Additional fluid layers may be incorporated in magnetic recording medium 10B, as desired for media performance, ease of coatability, or productivity. Thus, functional materials can be incorporated in discrete fluid layers. Alternatively, one or more functional materials can be incorporated in a single fluid layer that, when dried, forms a multi-functional layer in the resulting magnetic recording medium.

Figure 3:
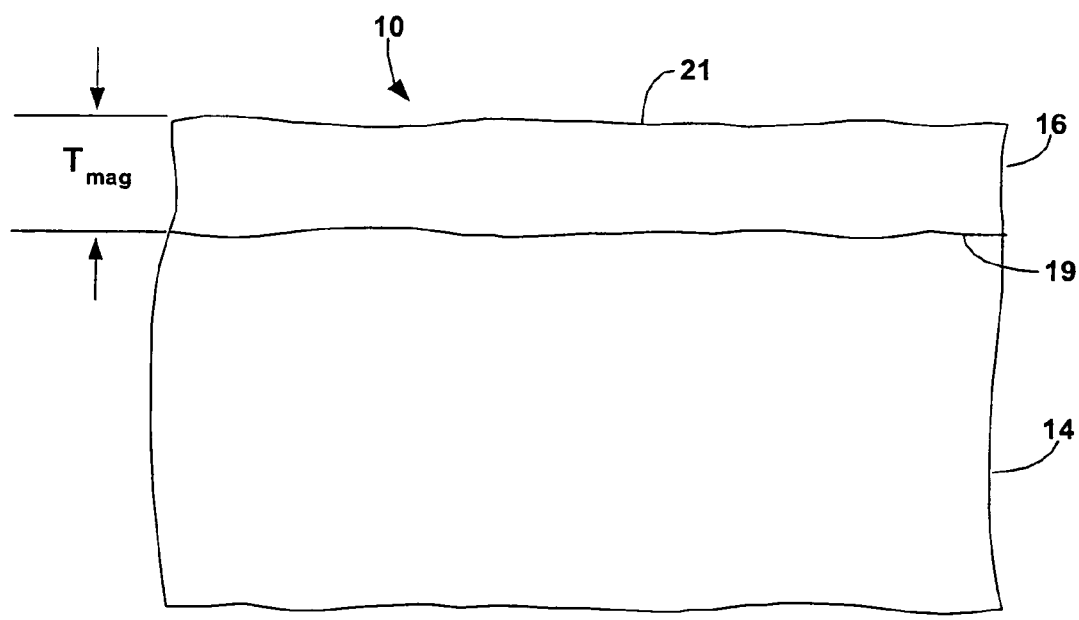
FIG. 3 is a cross-sectional side view of the magnetic recording medium of FIG. 1 illustrating the thickness of a magnetic recording layer.

FIG. 3 is a cross-sectional side view of magnetic recording medium 10A of FIG. 1 illustrating the thickness $T_{mag}$ of magnetic recording layer 16. As shown in FIG. 3, magnetic recording layer 16 has a lower surface 19 adjacent an upper surface of carrier layer 14, and an upper surface 21 opposite the carrier layer. Upper surface 21 of magnetic recording layer 16 may be exposed or coated with an additional layer as described with reference to FIG. 2. The thickness $T_{mag}$ represents an average thickness across magnetic recording layer 16 between lower surface 19 and upper surface 21. In accordance with the invention, average thickness $T_{mag}$ may be less than or equal to approximately 0.15 microns and, more preferably, less than or equal to approximately 0.10 microns. In addition, as a result of enhanced coating uniformity, the thickness of magnetic recording layer 16 may exhibit a reduction in average thickness variation in magnetic recording layer 16. A reduced thickness and reduced thickness variation can be effective in reducing the modulation, i.e., variation, in the magnetic flux modulation associated with magnetic recording layer 16. In other words, enhanced thickness uniformity in the recording layer can reduce magnetic flux modulation along the length and across the width of a magnetic recording tape.

Figure 4:
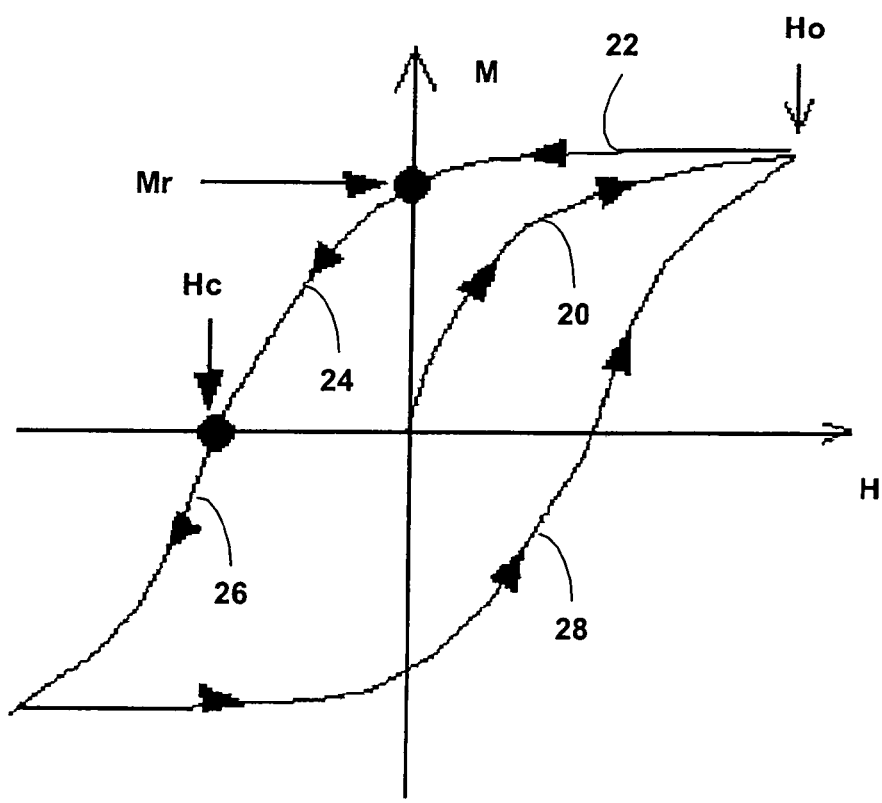
FIG. 4 is a hysteresis plot illustrating remanent magnetization and coercivity in a magnetic recording medium.

FIG. 4 is a hysteresis plot illustrating remanent magnetization and coercivity in a magnetic recording medium. The magnetic remanence (Mr), or remanent magnetization, is the permanent magnetization that remains in a magnetic material forming a magnetic recording layer after an external magnetic field is removed. Hence, the remanent magnetization supports the recording of data. Magnetic flux is a function of the remanent magnetization in recording layer 16 and the thickness of the recording layer. Accordingly, modulation of the thickness of recording layer 16 along the recording path can result in modulation of magnetic flux, and impact the signal-to-noise ratio of data recorded on and read from the magnetic recording medium. Excessive magnetic flux modulation can degrade signal-to-noise ratio, requiring more energy for effective recording. FIG. 4 is provided for illustration of a general case of remanent magnetization, and is not intended to represent the hysteresis plot for any particular recording material contemplated herein.

As shown in FIG. 4, for an unmagnetized recording material, induced magnetization increases along a magnetization curve 20 as an external magnetic field is applied. The induced magnetization eventually saturates, at Ho. If the external field is reduced, the induced magnetization also is reduced, but does not follow the original magnetization curve. Instead, the magnetic recording material follows a new magnetization curve 22 that reflects a permanent magnetization called the remanent magnetization Mr. If the external field is further reduced (curve 24), the remanent magnetization will eventually be removed, at Hc. The external field for which the remanent magnetization goes to zero is termed the coercivity Hc. As the external field continues to reverse (curve 26), permanent magnetization of the opposite sign is created, until saturation is reached. Curve 28 traces a path back to Ho, upon a decrease in the reverse magnetic field and the onset of a forward magnetic field.

Providing a magnetic recording layer with a more uniform thickness in the magnetic recording medium, in accordance with the invention, can improve the magnetic flux modulation characteristic. If the degree of magnetic flux varies across the surface of a magnetic recording layer, the magnetizations written to the layer may exhibit a different signal-to-noise ratio. Accordingly, the applicable noise floor for readout must assume a worst case, generally hampering increased storage densities and recording performance. Magnetic flux can vary, in particular, due to thickness variations in the magnetic recording layer. For example, this type of variation can influence the amount of magnetizable material within a given volume of the magnetic recording layer. A magnetic recording medium, as described herein, provides a magnetic recording layer with reduced thickness variation. Consequently, a magnetic recording medium constructed in accordance with the invention can provide reduced magnetic flux modulation.

Figure 5:
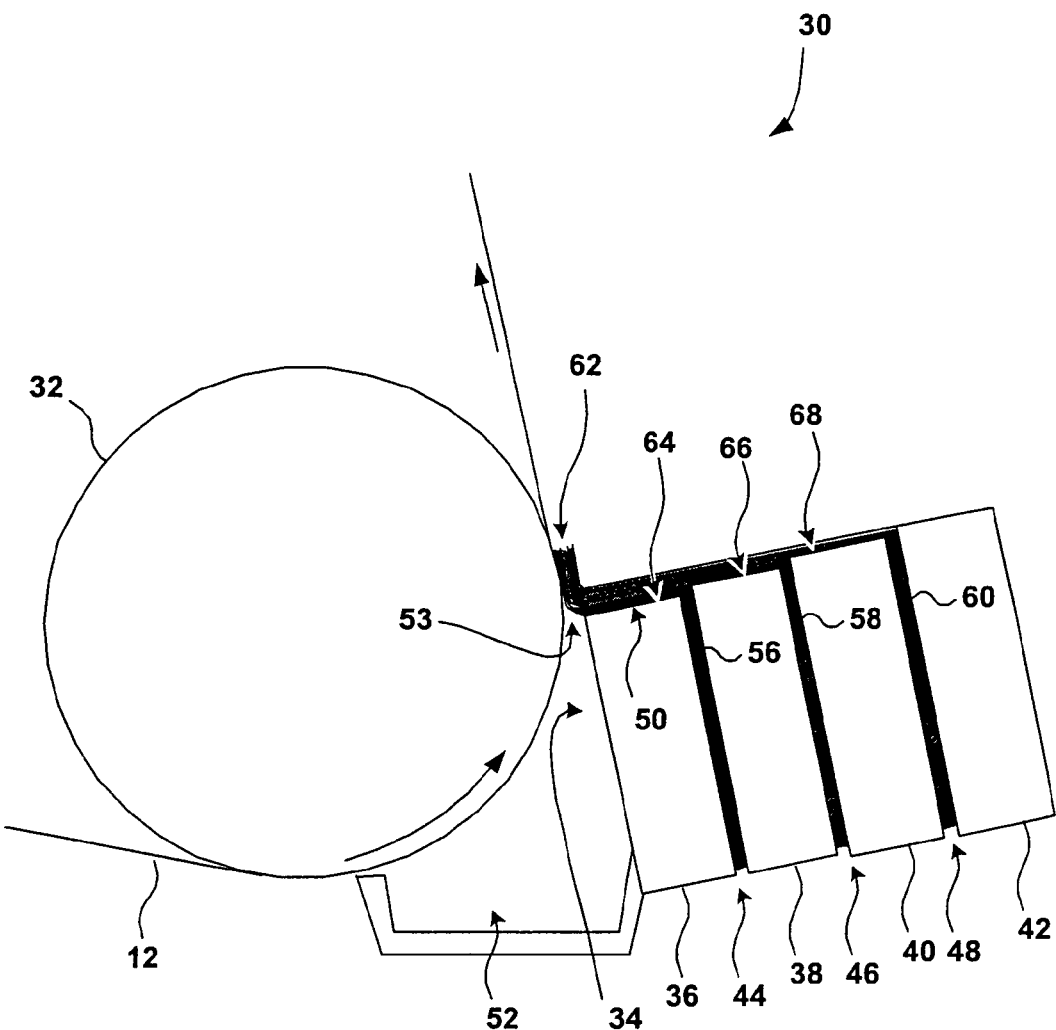
FIG. 5 is a side view of a slide coating apparatus useful in manufacturing a magnetic recording medium.

FIG. 5 is a side view of a slide coating system 30 useful in manufacturing a magnetic recording medium 10, e.g., as shown in FIG. 1 or FIG. 2. Slide coating represents a suitable technique for achieving a magnetic recording layer with a reduced thickness and reduced thickness variation. Other techniques such as dual slot coating also may be effective. In general, however, slide coating can provide enhance motion quality and coating uniformity to coating substrate 12. As shown in FIG. 5, slide coating system 30 includes a backup roller 32 provided proximate a slide coater 34 to support the backside, i.e., non-coating side, of a coating substrate 12. Coating substrate 12 takes the form of a continuous web. Backup roller 32 rotates in the direction of travel of substrate 12. Substrate 12 can be transported relative to slide coater 34 between supply and takeup rolls (not shown). Slide coater 34 can simultaneously coat two or more fluid layers in a stacked arrangement onto substrate 12. Following coating, the layers are dried, e.g., by transportation of substrate 16 through a drying oven (not shown).

Slide coater 34 may include multiple slide blocks 36, 38, 40, 42. In the embodiment of FIG. 5, slide coater 34 includes four slide blocks. In other embodiments, slide coater 34 may include fewer or more than four slide blocks, depending on the number of fluid layers to be coated onto substrate 12. In some embodiments, for example, the recording medium to be manufactured may include only a carrier layer and a recording layer, or only a recording layer. Slide blocks 36, 38, 40, 42 define fluid slots 44, 46, 48 and a combined slide surface 50. First slide block 36 is disposed adjacent back-up roller 32, while slide blocks 38, 40, 42 are disposed upward from the first slide block 36. Slide blocks 36, 38, 40 define a continuous slide surface for flow of coating fluids.

A vacuum box 52 can be provided to adjust the level of negative pressure adjacent slide coating system 20. In particular, vacuum box 52 serves to maintain a differential pressure across the coating bead 53 between a slide surface 50 and substrate 12, thereby stabilizing coating bead 53. Vacuum box 52 may be coupled to a vacuum source (not shown in FIG. 5) and include an outlet (not shown in FIG. 5) for material recovered from the coating area.

A first fluid 56 can be distributed to first slot 44 via a first fluid supply and a first manifold (not shown in FIG. 5). A second fluid 58 can be distributed to second slot 46 via a second fluid supply and a second manifold (not shown in FIG. 5). A third fluid 60 can be distributed to third fluid slot 48 via a third fluid supply and a third fluid manifold (not shown in FIG. 5). Thus, in an embodiment as shown in FIG. 5, slide coater 30 is capable of coating a three-layer fluid construction 62 that includes a first fluid layer 64 containing first fluid 56, a second fluid layer 66 containing second fluid 58, and a third fluid layer 68 containing third fluid 60. First fluid layer 64 can be coated onto substrate 12, with second fluid layer 66 being coated above first fluid layer 64, and third fluid layer 68 being coated above second fluid layer 66. The first, second and third fluid layers 64, 66, 68 may form, respectively, a sub layer, a recording layer, and a functional layer containing, e.g., an antistatic or head-cleaning agent. Third fluid layer 68 may be optional in some embodiments.

Fluids 56, 58, 60 may comprise a solvent plus a solute. Typical solvents may include, for example, methylene chloride, acetone, methyl ethyl ketone, methyl isobutyl ketone, ethyl acetate, butyl acetate, cyclohexanone, butyl alcohol, N,N-dimethylformamide, toluene, and mixtures thereof. When the solvent dries, the coating solute remains behind. In other words, coatings are applied as liquids for ease of application, but the coatings are dry in the finished product.

The type of solute carried by fluids 56, 58, 60 depends on the type of coating to be formed. In the manufacture of magnetic storage media, for example, the solute may include a plurality of magnetic particles. The magnetic particles may be acicular or needle-like magnetic particles with an average length along the major axis of less than about 0.3 mm. Typical acicular particles of this type include, for example, particles of ferro- and ferromagnetic iron oxides such as gamma-ferric oxide ($\gamma$-$Fe_2O_3$), complex oxides of iron and cobalt, various ferrites and metallic iron particles.

Alternatively, small tabular particles such as barium ferrites and the like can be employed. The particles can be doped with one or more ions of a polyvalent metal such as titanium, tin, cobalt, nickel, zinc, manganese, chromium, or the like. First fluid layer 64 may act as a carrier or "sub" layer for second and third fluid layers 66, 68. In this case, the wet thickness of first fluid layer 64 on substrate 12 may be substantially more than the wet thicknesses of second and third fluid layers 66, 68.

The widths of fluid slots 44, 46, 48 in a direction transverse to the direction of flow of 30 fluid layers 64, 66, 68 may be substantially commensurate with the width of substrate 12. Slide blocks 36, 38, 40 may be slightly wider than fluid slots 44, 46, 48. In some embodiments, the width of substrate 12 may be on the order of 6 to 30 inches (15.24 cm to 76.2 cm). In producing magnetic tape media, substrate 12 may be slit length-wise following coating into several strips, e.g., one-quarter inch (0.64 cm) in width, to produce continuous lengths of recording tape for loading into data cartridges. In producing magnetic disk media, disks can be cut or punched from substrate 16 as "cookies," e.g., 3.5 inches (90 mm) in diameter, for loading into floppy diskette housings. In either case, each fluid layer 64, 66, 68 preferably extends widthwise to the lateral edges of substrate 12.

In some embodiments, in which second fluid layer 66 forms the magnetic recording layer, second fluid 58 contains magnetic material such as metal magnetic recording particles. In this case, once dried, second fluid layer 66 forms a magnetic recording layer on substrate 12. In other embodiments, the magnetic material can be provided in first fluid layer 64, or in multiple fluid layers 64, 66, 68 of fluid construction 62. For example, multiple layers in fluid construction 62 may form multiple magnetic recording layers. Alternatively, individual magnetic layers can be arranged to work together as a composite multi-layer recording film.

As discussed above, third fluid 60 may contain a variety of different substances that contribute to the functional properties of the finished magnetic recording medium. In other words, once dried, third fluid layer 68 may form a functional layer of the magnetic recording medium. For example, third fluid 60 may contain antistatic material, abrasive material that aids the cleaning of recording heads during use, lubricating materials that reduce friction between the magnetic recording head and the surface of the magnetic recording medium, or a combination thereof.

Additional slide blocks can be added to slide coater 30 for the introduction of additional fluid layers, as desired for media performance, ease of coatability, or productivity. Thus, such functional materials can be incorporated in discrete fluid layers. Alternatively, one or more functional materials can be incorporated in a single fluid that, when dried, forms a multi-functional layer in the resulting magnetic recording medium.

As further shown in FIG. 5, backup roller 32 provides generally uniform support and tension to substrate 12 within vacuum box 52 over a substantial portion of the circumferential surface of the backup roller. In addition, backup roller 32 can be effective in providing precise control of the speed of travel of substrate 12. In this manner, backup roller 32 offers more effective control of the tension of substrate 12 as it travels within slide coating system 20, enabling enhanced coating uniformity relative to other coating techniques. Backup roller 32 also supports substrate 12 to maintain the uniformity of distance within the coating gap. In addition, the application of different fluid layers simultaneously by slide coater 34 avoids interaction of multiple wet surfaces from multiple coating devices, and tends to promote enhanced coating uniformity. In particular, the enhanced coating uniformity can be effective in promoting more uniform thickness within the recording layer, e.g., second fluid layer 66, thereby reducing magnetic flux modulation in the finished magnetic recording media. By reducing fluctuation of the coating thickness, magnetic flux modulation in the manufactured recording medium can be reduced.

A coating formulation suitable for use as second fluid layer 66 may have a formulation and characteristics as described below. In particular, the magnetic recording media preferably includes at least one magnetic layer formed from a magnetic coating composition comprising a binder and a plurality of magnetic particles dispersed within the binder. In addition to the at least one magnetic recording layer formed by second fluid layer 62, a magnetic recording medium in accordance with the invention may also include a nonmagnetic layer formed by first fluid layer 64 from a nonmagnetic coating composition comprising a binder and, optionally, nonmagnetic particles dispersed therein, and a nonmagnetic layer formed by third fluid layer 68.

As mentioned above, a magnetic coating composition suitable for formulation of second fluid layer 66 as well as a nonmagnetic coating composition suitable for formulation of first fluid layer 64 includes a binder. Suitable binders that can be used in the magnetic layer coating composition include, for example, vinyl chloride vinyl acetate copolymers, vinyl chloride vinyl acetate vinyl alcohol copolymers, vinyl chloride vinyl acetate maleic acid polymers, vinyl chloride vinylidene chloride copolymers, vinyl chloride acrylonitrile copolymers, acrylic ester acrylonitrile copolymers, acrylic ester vinylidene chloride copolymers, methacrylic ester vinylidene chloride copolymers, methacrylic esterstyrene copolymers, thermoplastic polyurethane resins, phenoxy resins, polyvinyl fluoride, vinylidene chloride acrylonitrile copolymers, butadiene acrylonitrile copolymers, acrylonitrile butadiene acrylic acid copolymers, acrylonitrile butadiene methacrylic acid copolymers, polyvinyl butyral, polyvinyl acetal, cellulose derivatives, styrene butadiene copolymers, polyester resins, phenolic resins, epoxy resins, thermosetting polyurethane resins, urea resins, melamine resins, alkyl resins, urea formaldehyde resins and the like.

The binders may be provided in a suitable non-aqueous solvent, such as methylene chloride, acetone, methyl ethyl ketone, methyl isobutyl ketone, ethyl acetate, butyl acetate, cyclohexanone, butyl alcohol, N,N-dimethylformamide, toluene, and mixtures thereof. Preferred binders include polyurethanes, non-halogenated vinyl copolymers, halogenated vinyl copolymers, and a combination thereof. As used herein, the term "nonhalogenated" means that the copolymer contains no covalently bound halogen atoms. Thus, the term "nonhalogenated" excludes vinyl halide monomers such as vinyl chloride or vinylidene chloride as monomeric components of the copolymer, but the term "nonhalogenated" does not exclude monomeric components such as (meth)acryloyloxyethyl trimethylammonium chloride in which chlorine is present as a chloride anion. As used herein, the prefix "(meth) acryl-" means "methacryl-" or "acryl-". The term "vinyl" with respect to a polymeric material means that the material comprises repeating units derived from vinyl monomers. As used with respect to a vinyl monomer, the term "vinyl" means that the monomer contains a moiety having a free-radically polymerizable carbon-carbon double bond. Monomers having such moieties are capable of copolymerization with each other via the carbon-carbon double bonds.

In the invention, one useful polyurethane is a carboxyl polyurethane polymer, such as that described in U.S. Pat. No. 5,759,666 (Carlson et al.). The carboxyl polyurethane polymer typically comprises the reaction product of a mixture comprising: (i) one or more polyisocyanates, (ii) a carboxylic acid functional polyol, and, (iii) optionally, one or more polyols defined to exclude the former carboxylic acid functional polyol, wherein the number of isocyanate-reactive groups present in the mixture prior to reaction exceeds the number of isocyanate groups and at least about 0.2 meq of carboxylic acid groups are present on the carboxyl polyurethane polymer per gram of carboxyl polyurethane polymer. Typically, the reaction product has a number average molecular weight from about 2000 to about 50,000, preferably from about 5000 to about 30,000.

The term "polyol," as used herein, refers to polyhydric alcohols containing an average of one or more hydroxyl groups and includes, monohydric alcohols, diols, triols, tetrols, etc. Preferred polyols are diols, that include both low molecular weight (i.e., having less than about 500 number average molecular weight) and oligomeric diols, typically having a number average molecular weight from about 500 to about 5000. Representative examples of low molecular weight diols include, but are not limited to, ethylene glycol, propylene glycol, diethylene glycol, diols having polar functional groups, diols bearing ethylenic unsaturation (e.g., 3-allyloxy-1,2-propandiol, 1-glyceryl (meth)acrylate, etc.) and fluorinated diols. Representative examples of oligomeric diols include, but are not limited to, polyether diols, polyester diols, polyether triols, and polyester triols.

The term "polyisocyanate," refers to any organic compound that has two or more reactive isocyanate (i.e., —NCO) groups in a single molecule that can be aliphatic, alicyclic, aromatic, and a combination thereof, and includes diisocyanates, triisocyanates, tetraisocyanates, etc., and a combination thereof. Preferably, diisocyanates are used and include diphenylmethane diisocyanate, isophorone diisocyanate, toluene diisocyanate, hexamethylene diisocyanate, tetramethylxylene diisocyanate, p-phenylene diisocyanate, and a combination thereof.

Another useful polyurethane is a phosphonated polyurethane, such as described in U.S. Pat. No. 5,501,903 (Erkkila et al.). Preferably, the phosphonated polyurethane includes nitrogen forming part of the backbone of the polymer, a single bond or divalent linking group (preferably including up to 4 linear carbon atoms), and two pendant groups independently selected from the group of an alkyl group, a cycloalkyl group, an aryl group, or together comprise the necessary carbon atoms to complete a ring. The phosphonated polyurethane is preferably formed by reaction of a soft segment diol in which the hydroxyl groups are separated by a flexible chain (typically having a molecular weight of more than 300, and includes a polycaprolactone diol, for example), a hard segment diol in which the hydroxyl groups are separated by a relatively inflexible chain (typically having a molecular weight of less than 300, and includes neopentyl glycol, for example), a triol (e.g., a polycaprolactone triol), a diisocyanate (e.g., toluene diisocyanate, 4,4-diphenylmethane diisocyanate, and isophorene diisocyanate), and a dialkyl phosphonate (e.g., diethyl bis-(2-hydroxyethyl) aminomethylphosphonate).

An example of a useful quaternary ammonium-containing polyurethane is a polymeric quaternary ammonium compound described in U.S. Pat. No. 5,759,666 (Carlson et al.). In particular, polymeric quaternary ammonium compounds preferably have a number average molecular weight greater than about 500, preferably selected from the group of a quaternary ammonium polyurethane, a quaternary ammonium functional non-halogenated vinyl copolymer, and a combination thereof.

A suitable binder may include a quaternary ammonium functionality. As used herein, the term "quaternary ammonium functionality" refers to moieties of the formula

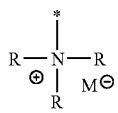

In the formula above, the bond denoted with the asterisk is attached to the backbone of the polymeric binder resin either directly or indirectly through a difunctional linking group; each R may independently be any suitable moiety or co-member of a ring structure, and is preferably H or an alkyl group of 1 to 10 carbon atoms such as —$CH_3$; and M is any suitable counter anion such as $Cl^-$, $BR^-$, or the like. The term "quaternary ammonium functionality" also would encompass sulfobetaines, (e.g., —$N^+(CH_3)_2(CH_2CH_2CH_2SO_3^-)$).

In one embodiment, the quaternary ammonium functional polymer is a nonhalogenated vinyl copolymer which is incorporated into the polymeric binder as the so-called "hard resin" component having a relatively high glass transition temperature ($T_g$).

In another embodiment, the nonhalogenated, vinyl copolymer is of the type comprising a plurality of pendant quaternary ammonium groups, a plurality of pendant crosslinkable moieties such as OH groups or moieties having carbon-carbon double bonds, and a plurality of pendant nitrile groups. Without wishing to be bound by theory, it is believed that the nitrile groups may promote the compatibility of these vinyl copolymers with polyurethanes. It is also believed that the pendant hydroxyl groups of the vinyl copolymer not only facilitate dispersion of the magnetic pigment in the polymeric binder, but also promote solubility, cure, and compatibility with other polymers. The quaternary ammonium groups of the vinyl copolymer facilitate dispersion of the magnetic pigment in the polymeric binder.

In yet another embodiment, the quaternary ammonium functional polymer is a quaternary ammonium polyurethane that has at least one quaternary ammonium group pendant from a polyurethane chain of molecular weight greater than about 500.

Another useful non-halogenated vinyl copolymer is one having a plurality of pendant nitrile groups, a plurality of pendant hydroxyl groups, and at least one pendant dispersing group, as described in U.S. Pat. No. 5,501,903 (Erkkila et al.) and U.S. Pat. No. 5,510,187 (Kumar et al.), for example. The non-halogenated vinyl copolymer having a plurality of pendant nitrile groups, a plurality of pendant hydroxyl groups, and at least one pendant dispersing group is preferably a nonhalogenated vinyl copolymer of monomers comprising 5 to 40, preferably 15 to 40, parts by weight of (meth)acrylonitrile; 30 to 80 parts by weight of one or more nonhalogenated, nondispersing, vinyl monomers; 1 to 30 parts by weight of a nonhalogenated, hydroxyl functional, vinyl monomer; and 0.25 to 10 parts by weight of a nonhalogenated, vinyl monomer bearing a dispersing group. The dispersing group can be selected from quaternary ammonium, acid or salt of carboxyl, acid or salt of phosphate or phosphonate, acid or salt of sulfate or sulfonate, and mixtures thereof. When the dispersing group is quaternary ammonium, it is preferred that the vinyl monomer bearing a dispersing group is (meth)acryloyloxyethyl trimethylammonium chloride.

Preferably, the nonhalogenated, nondispersing, vinyl monomer is selected from styrene; an alkyl ester of (meth) acrylic acid wherein the alkyl group of the alkyl ester has 1 to 20 carbon atoms; and a blend comprising styrene and such an alkyl ester (e.g., methyl (meth)acrylate, more preferably methyl methacrylate) wherein the weight ratio of styrene to the alkyl ester is in the range from 10:90 to 90:10.

Significantly, halogenated vinyl copolymers are also useful, and susceptible to slide coating in accordance with the invention. These include vinyl chloride resins, vinyl chloride-vinyl acetate resins, vinyl chloride-vinyl acetate-vinyl alcohol resins, vinyl chloride-vinyl acetate-maleic anhydride resins, and a combination thereof, such as those described in U.S. Pat. No. 5,763,046 (Ejiri et al.). Preferably, these resins also include one or more polar groups bonded thereto. Preferred polar groups include $SO_3M^1$, $COO\,M^1$, $OSO_3M^1$, $P=O(O\,M^2)O\,M^3$, —$OP=O(O\,M^2)O\,M^3$, —$NRX$, $OH$, $NR_1$, $N^+R_2$ (wherein R is a hydrocarbon group), an epoxy group, SH, and CN. One more useful type of vinyl chloride resin is a vinyl chloride copolymer containing epoxy groups, e.g., a copolymer containing a vinyl chloride repeating unit, an epoxy-containing repeating unit, and, if desired, a polar group-containing unit (e.g., —$SO_3M$, —$OSO_3M$, —$COOM$, and —$PO(OM)^2$, wherein M is hydrogen or an alkali metal). Of these, a copolymer containing a repeating epoxy group and a repeating unit containing —$SO_3Na$ are particularly useful.

The polymers mentioned above may be prepared by polymerization methods known in the art, including but not limited to bulk, solution, emulsion and suspension free-radical polymerization methods. For example, according to the solution polymerization method, copolymers are prepared by dissolving the desired monomers in an appropriate solvent, adding a chain-transfer agent, a free-radical polymerization initiator, and other additives known in the art, sealing the solution in an inert atmosphere such as nitrogen or argon, and then agitating the mixture at a temperature sufficient to activate the initiator.

A variety of additives known to those skilled in the art can be incorporated into the dispersions and coatings described herein. The dispersions and coatings can further comprise additives including but not limited to those selected from the group consisting of crosslinkers, head-cleaning agents, lubricants, carbon black, dispersants, and wetting agents.

For example, if desired, a binder composition may also include a crosslinker. One preferred type of crosslinker is a polyisocyanate crosslinker known to the magnetic recording media art cure to a glass transition temperature of greater than about 100° C. and may be used to produce layers of high glass transition temperature and hardness. A particularly useful type of polyisocyanate crosslinker is the reaction product of an excess of a diisocyanate with low number average molecular weight (under about 200) diols and triols. A typical and widely used curative comprises, for example the adduct of toluene diisocyanate with a mixture of trimethylol propane and a diol such as butane diol or diethylene glycol. A preferred material of this type is available under the trade designation MONDUR CB-55N from Bayer Corporation. Other useful high Tg crosslinkers are available under the trade designations MONDUR CB-601, MONDUR CB-701, MONDUR MRS, and DESMODUR L (all available from Bayer Corporation) and CORONATE L (available from Nippon Polyurethane). Additional isocyanate crosslinking agents are described in U.S. Pat. No. 4,731,292 (Sasaki et al.).

A toughened polyisocyanate crosslinker which cures to a tough and flexible, rather than a brittle, film may be desirable. Useful toughened polyisocyanate crosslinkers are described in U.S. Pat. No. 5,759,666 (Carlson et al.) and are obtained as the reaction product of an excess of a polyisocyanate with polyols, including 10-80% by weight of an oligomeric polyol which acts as a toughening segment. The oligomeric polyols useful in making toughened polyisocyanate curatives have a number average molecular weight of about 500 to about 5000 and a glass transition temperature of lower than about 0° C., preferably lower than about minus 20° C. The oligomeric polyols are preferably selected from the group consisting of a polyester diols, polyester triols, polyether diols, polyether triols, polycarbonate diols, polycarbonate triols, and mixtures thereof.

One of the preferred toughened polyisocyanate crosslinkers is made from the reaction product of CB-55N (described above), with 45 weight percent of a polycaprolactone diol of 1300 number average molecular weight. This modification of CB-55N provides a faster cure and a tougher coating. It is preferred in formulations in the dispersions and coatings of the invention to use between about 20 and about 60 weight percent, most preferably about 30 to about 50 weight percent of the toughened polyisocyanate curative based upon the weight of formulation solids exclusive of particles.

As mentioned above, other additives include head-cleaning agents, lubricants, carbon black, dispersants, and wetting agents. It is envisioned that lubricants such as those disclosed in U.S. Pat. No. 4,731,292 (Sasaki et al.), U.S. Pat. No. 4,784,907 (Matsufuji et al.), and U.S. Pat. No. 5,763,076 (Ejiri et al.) could be added to obtain desired frictional and processing characteristics. Examples of useful lubricants include but are not limited to those selected from the group consisting of $C_{10}$ to $C_{22}$ fatty acids, $C_1$ to $C_{18}$ alkyl esters of fatty acids, and mixtures thereof. Other examples of useful lubricants include those selected from the group consisting of silicone compounds such as silicone oils, fluorochemical lubricants, fluorosilicones, and particulate lubricants such as powders of inorganic or plastic materials. Preferred lubricants include those selected from the group consisting of myristic acid, stearic acid, palmitic acid, isocetyl stearate, oleic acid, and butyl and amyl esters thereof. Typically mixtures of lubricants are used, especially mixtures of fatty acids and fatty esters.

The dispersion may further comprise about 1 to about 10 weight percent of a wetting agent based upon the weight of the magnetic particles. Suitable wetting agents include but are not limited to those selected from the group consisting of phosphoric acid esters such as mono-phosphorylated propylene oxide adducts of glycerol, e.g., the reaction product of 1 mole of phosphorous oxychloride with the reaction product of 10-11 moles of propylene oxide and 1 mole of glycerine.

Examples of useful head cleaning agents include but are not limited to those disclosed in U.S. Pat. No. 4,784,914 (Matsufuji et al.) and U.S. Pat. No. 4,731,292 (Sasaki et al.). Examples of such head cleaning agents include but are not limited to those selected from the group consisting of alumina, chromium dioxide, alpha iron oxide, and titanium dioxide particles of a size less than about 2 microns, preferably less than 0.5 microns, which have a Mohs hardness of greater than about 5 and which are added in an amount ranging from about 0.2 to about 20 parts per hundred parts of magnetic particles.

As mentioned above, a magnetic layer contains a plurality of magnetic particles. Preferably, the magnetic particles are acicular or needle like magnetic particles. The average length of these particles along the major axis preferably is less than about 0.3 µm, and more preferably, less than about 0.2 µm. The particles preferably exhibit an axial ratio, that is, a length to diameter thickness ratio of up to about 5 or 6 to 1. Preferred particles have a specific surface area of at least about 30 $m^2/g$, more preferably of at least about 40 $m^2/g$. Typical acicular particles of this type include, for example, particles of ferro- and ferromagnetic iron oxides such as gamma-ferric oxide ($\gamma$-$Fe_2O_3$), complex oxides of iron and cobalt, various ferrites and metallic iron particles. Alternatively, small tabular particles such as barium ferrites and the like can be employed. The particles can be doped with one or more ions of a polyvalent metal such as titanium, tin, cobalt, nickel, zinc, manganese, chromium, or the like as is known in the art. The magnetic particles can be present in the dispersion in an amount of from about 50% to about 90% by weight, preferably about 60% to about 80% by weight.

A preferred particle is a magnetic alloy particle having high coercivities and high saturation magnetization that preferably include about 15 to 45 atomic %, preferably 20 to 45 atomic percent, Co based on the amount of Fe present (i.e., 100× (atoms of Co/atoms of Fe)). Preferably, these alloy particles have coercivities greater than about 1800 Oersteds (Oe), more preferably, from about 1800 to about 2500 Oe, and even more preferably, about 2000 to about 2400 Oe. The saturation of magnetization of the alloy particles is preferably greater than or equal to 130 emu/g and, more preferably, greater than 135 emu/g. Such metal alloy particles can be prepared by the method described in U.S. Pat. No. 5,735,969 (Lown et al.), and are commercially available from Dowa Mining, Kanto Denka, and Toda Kogyo Corporation, for example.

Magnetic particles for use in the invention may incorporate at least a first surface treatment agent that is desirably adsorbed onto the surfaces of the magnetic pigment. The surface treatment agent is a compound comprising at least one acidic group and at least one electron withdrawing group. Advantageously, the use of a surface treatment agent with this kind of multiple functionality improves the dispersability of magnetic pigments in polymeric binders having quaternary ammonium functionality. As a result, the corresponding magnetic recording media are easier to manufacture and have better electromagnetic and mechanical performance properties than if the surface treatment agent lacked one or both of the acid or electron withdrawing functionalities.

A wide variety of acidic groups may be used as the acidic group of the surface treatment agent of this invention with beneficial results. Representative examples of suitable acidic groups include an anhydric group, a —COOH group, sulfonic acid, a phosphonic acid group, salts of such groups, combinations of these, and the like. Of these, —COOH is presently most preferred in combination with metal particle magnetic pigments. In the practice of the invention, a salt of an acidic group is also deemed to be an acidic group within the scope of the invention.

As used herein, the term "electron-withdrawing" group is a group which, if substituted for a Hydrogen atom (other than the acidic H) on a carboxylic acid would make the acid have a lower pKa, i.e. the functional group has a Hammett Substituent Constant greater than 0.1 as described in Introduction to *Organic Chemistry*, Andrew Streitwieser, Jr. and Clayton H. Heathcock, McMillan Publishing Co., Inc. (NY, N.Y. 1976) pp. 947-949. Representative examples of electron withdrawing groups include nitro, chloro, bromo, fluoro, iodo, oxo, perfluoroalkyl (such as trifluoromethyl), perfluoroalkoxy, hydroxy, cyano, combinations of these, and the like.

The magnetic layer desirably incorporates a sufficient amount of the surface treatment agent effective to ease dispersion and help prevent agglomeration of the magnetic pigment during preparation of the magnetic recording medium of this invention. The optimum amount of surface treatment agent will depend upon a number of factors including the acid equivalent weight of the surface treatment agent, the specific surface area of the magnetic pigment being surface treated, the pH of magnetic pigment being treated, and the like.

In one preferred embodiment, the surface treatment agent is a compound having the formula

E-X-A wherein E is the electron withdrawing group, A is the acidic group, and X comprises an aromatic moiety. Preferably, X is an aromatic ring, and E and A are substituents of the aromatic ring at meta or para positions relative to each other. More preferably, E and A are at a para position relative to each other. Due to greater spacing between the E and A groups, the surface treatment agent is much more effective when E and A are at a meta or para position relative to each other as compared to the performance of the agent if E and A were to be ortho to each other.

Preferably, the plurality of magnetic particles are first prepared as a concentrated magnetic particle dispersion prior to its addition to the binder. The concentrated magnetic particle dispersion can be prepared by procedures known to those in the dispersion art. The dispersion can be prepared by the use of a dispersing machine, for example, a high speed impeller mill, an attritor, or a sand mill.

The concentrated magnetic particle dispersion can be diluted with a suitable non-aqueous organic solvent to make a magnetic coating composition. Typically, the non-aqueous organic solvent has dissolved or dispersed therein a binder, as described above. Solvents useful for dilution of the concentrated magnetic dispersion include ketones such as acetone, methyl ethyl ketone, methyl isobutyl ketone, cyclohexanone, isophorone; esters such as methyl acetate, ethyl acetate, butyl acetate, isobutyl acetate, isopropyl acetate, ethyl lactate, glycol monoethyl ether acetates; ethers such as diethyl ether, tetrahydrofuran, glycol dimethyl ethers, dioxane; aromatic hydrocarbons such as benzene, toluene, xylene, cresol, chlorobenzene, styrene; chlorinated hydrocarbons such as methylene chloride, ethylene chloride, carbon tetrachloride, chloroform, ethylene chlorohydrin, dichlorobenzene; N,N-dimethylformamide, and hexane.

In some embodiments of the invention, it may be desirable to incorporate the binder described herein in a coating composition that is not required to possess magnetic properties, such as a primer/adhesion promoting layer, an activator layer, a sub layer (typically located between the magnetic layer and the substrate), and a top layer. For example, a coating composition for forming a sub layer such as first fluid layer 60 can comprise non-magnetizable particles, such as, for example, those selected from the group consisting of carbon black, alpha-iron oxide, aluminum oxide, titanium dioxide, zinc oxide, silica gel, calcium carbonate, barium sulfate, and mixtures thereof.

A variety of additives, such as those listed above, may also be incorporated into a non-magnetic layer such as third fluid layer 64. A suitable additive can include head-cleaning agents, lubricants, carbon black, dispersants, wetting agents, and the like.

EXAMPLE

All materials used in this example are readily available from standard commercial sources, unless otherwise specified. All percentages are by weight unless otherwise indicated. Coating formulations were prepared for both a first fluid layer and a second fluid layer to be coated on a substrate to form a magnetic recording medium. The first fluid layer served as a sub layer for application to the substrate. The second fluid layer was deposited on top of the sub layer and formed a recording layer. The first fluid layer (the sub layer) was formed with the following formulation:

|  | PPH - Metal Pigment | Solution |
|---|---|---|
| Mill Additions |  |  |
| DPN 250 alpha iron oxide (metal pigment - 0.15 micron length) | 100.00 | 100.00 |
| BP2000 carbon black | 6.00 | 6.00 |
| K32 (Styrene acronitrile copolymer) | 17.19 | 39.06 |
| Z2 Urethane resin | 8.59 | 21.49 |
| Myristic Acid | 0.50 | 0.50 |
| Butyl Stearate | 0.50 | 0.50 |
| Methyl Ethyl Ketone |  | 23.25 |
| Methyl Isobutyl Ketone |  | 136.64 |
| Tetrahydrofuran |  | 106.59 |
| Mill Solids (30.6%) | 132.78 | 434.03 |
| Coating Additions |  |  |
| Butyl Stearate | 0.50 | 0.50 |
| PPA45 (isocyanate-containing curative - 50% Solids) | 6.44 | 12.89 |
| Methyl Ethyl Ketone |  | 18.00 |
| Methyl Isobutyl Ketone |  | 40.49 |
| Tetrahydrofuran |  | 31.49 |
| Coating Solids (26%) | 139.72 | 537.40 |

The alpha iron oxide was obtained in a 0.15 micron length from Toda Kogyo Corp. The BP 2000 (Black Pearls 2000) was obtained from Cabot Corporation. The myristic acid and butyl stearate were both obtained from Henkel Canada Ltd.

The second fluid layer served as a recording layer, and was formed with the following formulation:

|  | PPH-Metal Pigment | Solution |
|---|---|---|
| Mill Additions |  |  |
| HM-101 magnetic pigment (Hc 1830, 0.1 micron) | 100.00 | 100.00 |
| Ceralox APA 0.4 Alumina | 19.73 | 30.50 |
| BP 2000 carbon black | 0.50 | 0.50 |
| 4-Nitrobenzoic Acid | 4.00 | 4.00 |
| K32 (44% solids) styrene acronitrile copolymer | 6.33 | 13.64 |
| Z2 (40% solids) urethane resin | 6.00 | 15.00 |
| Methyl Ethyl Ketone |  | 126.50 |
| Methyl Isobutyl Ketone |  | 60.06 |
| Tetrahydrofuran |  | 31.30 |
| Mill Solids (35.8%) | 136.57 | 381.50 |
| Coating Additions |  |  |
| Myristic Acid | 0.50 | 0.50 |
| Butyl Stearate | 1.00 | 1.00 |
| PPA45 (isocyanate-containing curative - 50% Solids) | 6.90 | 13.73 |
| Methyl Ethyl Ketone |  | 213.16 |
| Methyl Isobutyl Ketone |  | 81.98 |
| Tetrahydrofuran |  | 32.79 |
| Coating Solids (20.0%) | 144.97 | 724.67 |

The magnetic pigment was obtained from Dowa Mining Co., Ltd. The 4-nitrobenzoic acide was obtained from Nordic Synthesis AB. The alumina was obtained from the Ceralox Division of Condea Vista.

A number of samples of the above liquid coating formulations were coated onto a substrate to form a magnetic recording medium. Following drying, the magnetic recording layer exhibited the characteristics indicated in Table 1 below.

TABLE 1

| SAMPLE | 1 | 2 | 3 | 4 | 5 |
|---|---|---|---|---|---|
| Coater | Slide | Slide | Slide | Slide | Slide |
| Hc | 2444 | 2425 | 2430 | 2532 | 2573 |
| SFD | .044 | 0.39 | 0.40 | 0.40 | 0.42 |
| Phi-R | 0.4022 | 0.4640 | 0.5085 | 0.4314 | 0.1986 |
| Phi-M | 0.5000 | 0.5611 | 0.6072 | 0.4952 | 0.2372 |
| SQ Ratio | 0.804 | 0.827 | 0.837 | 0.871 | 0.837 |
| Tmag | 0.089 | 0.099 | 0.11 | .086 | 0.043 |
| Mr Delta | 2.17 | 2.22 | 2.58 | 2.28 | 1.19 |
| Sigma | 0.062 | 0.07 | 0.055 | 0.046 | 0.034 |

In Table 1, the coater refers to the type of coater used in forming the magnetic recording medium, i.e., slide versus die coater. In this Example, a slide coater similar to that depicted in FIG. 5 was used. In Table 1, $H_c$ refers to the measured coercivity of the recording layer, SFD refers to switching field distribution, SQ Ratio refers to the squareness of the hysteresis curve and thus the ratio of remanent magnetization to coercivity, Tmag refers to the average thickness of the magnetic recording layer in a recording direction in microns, MR Delta refers to the variation in the remanent magnetization along the recording direction, and Sigma refers to the standard deviation of the remanent magnetization.

As shown in Table 1, the resulting magnetic recording layer exhibited a magnetic flux modulation (Mr Delta) characteristic with a deviation of less than or equal to 0.07 for samples 1 and 2 and less than 0.06 for samples 3, 4 and 5. Indeed, sample 4 produced a standard deviation of less than 0.05, and sample 5 produced a standard deviation of less than 0.04.

Figure 6:
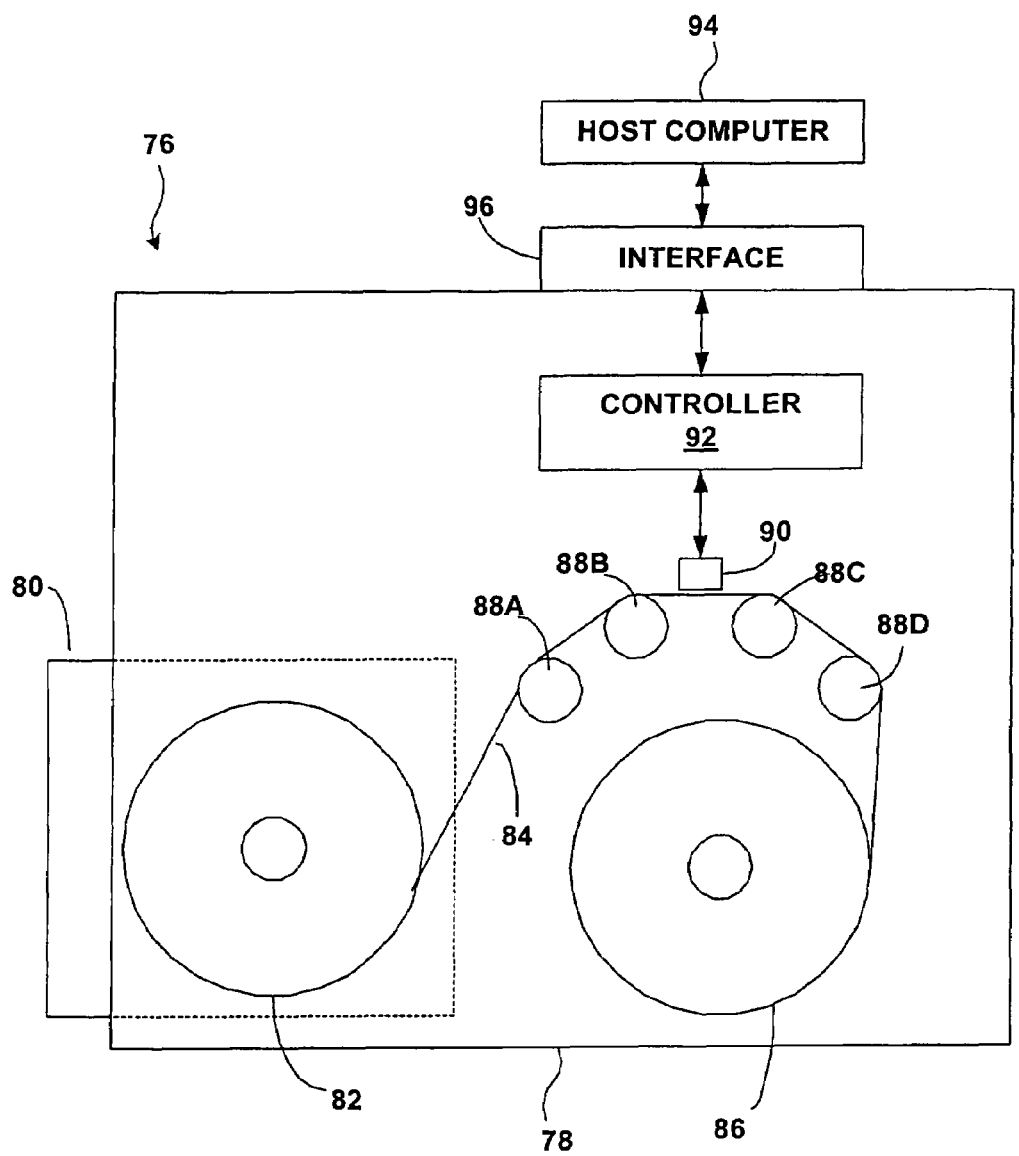
FIG. 6 is a block diagram of a magnetic recording system.

FIG. 6 is a block diagram of a magnetic recording system 76 that may include a magnetic recording medium 10 as described herein. In particular, magnetic recording system 76 may incorporate a magnetic tape exhibiting a reduced magnetic flux modulation characteristic. As shown in FIG. 6, magnetic recording system 76 may include a tape drive housing 78 that receives a tape cartridge. Tape cartridge 80 contains a tape reel 82 that delivers magnetic tape to a takeup reel 86 within tape drive housing 78. Tape 84 may travel along a tape path defined by a plurality of tape guides 88A-88D.

The tape path brings tape 84 into proximity with a magnetic read/write head assembly 90. Head assembly 90 includes a write head that forms magnetizations along tracks on tape 84 to store data. In addition, head assembly 90 includes a read head that reads the magnetizations from tape 84 to retrieve data. A controller 92 controls the operation of a current drive circuit that drives head assembly 90. Controller 92 communicates with a host computer 94 via a computer interface 96, e.g., PCI, USB, SCSI, IEEE 1394, or the like. In operation, magnetic recording system 76 may benefit from enhanced performance as a result of the reduced remanent magnetization and increased signal-to-noise ratio provided by magnetic tape 84, as described herein.

A number of embodiments of the invention have been described. Nevertheless, it will be understood that various modifications may be made without departing from the spirit and scope of the invention. Other embodiments are within the scope of the following claims.

The invention claimed is:

1. A magnetic tape recording system comprising:
   a magnetic tape including a substrate and a magnetic recording layer formed over the substrate, wherein the magnetic recording layer has an Mr Delta expressed in milli-electromagnetic units per centimeter squared (memu/cm$^2$) between approximately 1.19 and 2.58 memu/cm$^2$ with a standard deviation of the Mr Delta between approximately 0.034 and 0.07 memu/cm$^2$;
   a magnetic head; and
   a controller that controls the magnetic bead to read data from and write data to the magnetic tape medium.

2. The magnetic tape recording system of claim 1, wherein the magnetic recording layer has an average thickness of less than or equal to approximately 0.15 microns.

3. The magnetic tape recording system of claim 1, Wherein the magnetic recording layer has an average thickness of less than or equal to approximately 0.10 microns.

4. The magnetic tape recording system of claim 1, wherein the magnetic recording layer exhibits a coercivity of greater than approximately 2000 Oe.

5. The magnetic tape recording system of claim 1, wherein the magnetic recording layer has a coercivity of greater than approximately 2300 Oe.

6. The magnetic tape recording system of claim 1, wherein the magnetic recording layer includes metal magnetic particles dispersed in a polymeric binder.

7. The magnetic tape recording system of claim 1, wherein the standard deviation of the Mr Delta is less than or equal to approximately 0.05 memu/cm$^2$.

8. The magnetic tape recording system of claim 1, wherein the standard deviation of the Mr Delta is less than or equal to approximately 0.04 memu/cm$^2$.

9. The magnetic tape recording system of claim 1, the magnetic tape medium further comprising a carrier layer formed between the substrate and the magnetic recording layer.

10. The magnetic tape recording system of claim 1, wherein the Mr Delta is between approximately 1.19 and 2.28.

11. The magnetic tape recording system of claim 10, wherein the Mr Delta is between approximately 1.19 and 2.17.

12. The magnetic tape recording system of claim 1, wherein the head has sufficient sensitivity to acquire a useful signal-to-noise ratio (SNR) from the magnetic tape medium that includes the magnetic recording layer that exhibits the Mr Delta between approximately 1.19 and 2.58.

13. The magnetic tape recording system of claim 1, wherein the magnetic recording layer exhibits a coercivity of geater than approximately 2000 Oe and the head generates sufficient fields to record on the magnetic recording layer.

14. A magnetic tape recording system comprising:
   a magnetic tape including a substrate and a magnetic recording layer formed over the substrate, wherein the magnetic recording layer has an Mr Delta expressed in milli-electromagnetic units per centimeter squared (memu/cm$^2$) between approximately 1.19 and 2.58 memu/cm$^2$, wherein a standard deviation of the Mr Delta is less than approximately 0.07 memu/cm$^2$.

a magnetic head; and a controller that controls the magnetic head to read data from and write data to the magnetic tape.

15. The magnetic tape recording system of claim 14, wherein the Mr Delta is between approximately 1.19 and 2.17 memu/cm$^2$.

16. The magnetic tape recording system of claim 14, wherein the magnetic recording layer has a coereivity of greater than approximately 2300 Oe.

17. The magnetic tape recording system of claim 14, further comprising a carrier layer formed between the substrate and the magnetic recording layer.

* * * * *

UNITED STATES PATENT AND TRADEMARK OFFICE
CERTIFICATE OF CORRECTION

| | | |
|---|---|---|
| PATENT NO. | : 7,423,840 B2 | Page 1 of 1 |
| APPLICATION NO. | : 11/233576 | |
| DATED | : September 9, 2008 | |
| INVENTOR(S) | : Gary L. Huelsman, Subodh K. Kulkarni and W. Blake Kolb | |

It is certified that error appears in the above-identified patent and that said Letters Patent is hereby corrected as shown below:

Column 16
    Line 16, "bead" should read --head--.
    Line 22, "claim 1, Wherein" should read --claim 1, wherein--.

Column 18
    Line 2, "coereivity" should read --coercivity--.

Signed and Sealed this

Nineteenth Day of May, 2009

JOHN DOLL
*Acting Director of the United States Patent and Trademark Office*